US009298055B2

(12) United States Patent
Masutani et al.

(10) Patent No.: US 9,298,055 B2
(45) Date of Patent: Mar. 29, 2016

(54) ARRAY SUBSTRATE, METHOD OF DISCONNECTION INSPECTING GATE LEAD WIRE AND SOURCE LEAD WIRE IN THE ARRAY SUBSTRATE, METHOD OF INSPECTING THE ARRAY SUBSTRATE, AND LIQUID CRYSTAL DISPLAY DEVICE

(71) Applicant: Mitsubishi Electric Corporation, Tokyo (JP)

(72) Inventors: Yuichi Masutani, Kumamoto (JP); Katsuaki Murakami, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 86 days.

(21) Appl. No.: 14/325,631

(22) Filed: Jul. 8, 2014

(65) Prior Publication Data
US 2015/0015820 A1 Jan. 15, 2015

(30) Foreign Application Priority Data

Jul. 12, 2013 (JP) ................. 2013-146082

(51) Int. Cl.
*G02F 1/1333* (2006.01)
*G02F 1/136* (2006.01)
*G02F 1/1362* (2006.01)
*G02F 1/13* (2006.01)
*G02F 1/1345* (2006.01)
*G09G 3/00* (2006.01)
*G09G 3/36* (2006.01)

(52) U.S. Cl.
CPC ........ *G02F 1/136286* (2013.01); *G02F 1/1309* (2013.01); *G02F 1/1345* (2013.01); *G09G 3/006* (2013.01); *G02F 2001/136254* (2013.01); *G09G 3/3648* (2013.01)

(58) Field of Classification Search
CPC ............ G02F 1/1368; G02F 1/136213; G02F 1/1333; G02F 1/133305; G02F 1/133351; G02F 2001/133354; G02F 2001/136263; G02F 2001/136272; G02F 1/133377; G02F 1/133512; G02F 1/133345; G02F 1/136259; G02F 1/1309; G02F 1/1345; H01L 27/12
USPC ...................................... 349/54, 42, 84, 158
See application file for complete search history.

(56) References Cited

U.S. PATENT DOCUMENTS 6,204,836 B1* 3/2001 Yamazaki ............... G09G 3/006
345/98
2014/0191930 A1* 7/2014 Okumoto ............... G09G 3/006
345/55

FOREIGN PATENT DOCUMENTS

JP   S64-009375 A    1/1989
JP   2011-154161 A   8/2011

* cited by examiner

*Primary Examiner* — Mike Qi
(74) *Attorney, Agent, or Firm* — Studebaker & Brackett PC

(57) ABSTRACT

An array substrate has a plurality of gate signal lines, a plurality of source signal lines orthogonal to the plurality of gate signal lines, a plurality of gate-driver mounting terminals, a plurality of source-driver mounting terminals, a plurality of gate-side array inspection terminals connected to the gate signal lines, a plurality of source-side array inspection terminals connected to the source signal lines, a plurality of gate lead wire disconnection inspection circuits connected between the plurality of gate-driver mounting terminals and a common terminal for a gate lead wire disconnection inspection, and a plurality of source lead wire disconnection inspection circuits connected between the plurality of source-driver mounting terminals and a common terminal for a source lead wire disconnection inspection.

11 Claims, 6 Drawing Sheets

ARRAY SUBSTRATE, METHOD OF DISCONNECTION INSPECTING GATE LEAD WIRE AND SOURCE LEAD WIRE IN THE ARRAY SUBSTRATE, METHOD OF INSPECTING THE ARRAY SUBSTRATE, AND LIQUID CRYSTAL DISPLAY DEVICE

BACKGROUND OF THE INVENTION

1. Field of the Invention

The present invention relates to an array substrate, method of disconnection inspecting a gate lead wire and a source lead wire in the array substrate, a method of inspecting the array substrate, and a liquid crystal display device.

2. Description of the Background Art

In process of manufacturing a liquid crystal display panel, an inspection of disconnection in an array substrate in which a circuit for display is formed on glass, a defect of a pixel, or the like is performed. Concretely, by writing charges in pixels constructing a display region and reading the charges, an inspection for disconnection in a gate signal line and a source signal line in a semiconductor switching element, a defect of a pixel, and a failure of a semiconductor switching element is performed.

The inspection is generally sequentially performed by bringing probes into contact with inspection terminals provided for gate signal lines and source signal lines in a lump, supplying an inspection signal to the gate signal lines and the source signal lines, and causing semiconductor switching elements formed at intersecting points to operate.

As inspection terminals, generally, terminals (mounting terminals) for mounting a semiconductor chip and an FPC in a later process are used or inspection terminals are separately provided near mounting terminals. By providing inspection terminals in such a part, disconnection in wires (lead wires) from the inspection terminals to the display region can be also detected.

In the above-described array substrate inspecting method, in the case of performing probing on mounting terminals, a probe unit corresponding to the mounting terminal has to be fabricated. As the resolution of display panels is becoming higher and the density of semiconductor chips is becoming higher, there is the tendency that the number of probes constructing a probe unit increases, and the probe interval becomes narrower, and it is becoming difficult to fabricate the probe unit.

On the other hand, methods of performing an inspection for disconnection in gate signal lines and source signal lines of semiconductor switching elements provided in a display region of a display panel, a defect of a pixel, or the like by turn on or off of pixels of the display panel are also known. As one of the inspection methods, there is a known method of performing an inspection on a plurality of gate signal lines and a plurality of source signal lines in a lump by bringing probes into contact with inspection terminals and controlling supply of inspection signals to the plurality of gate signal lines and the plurality of source signal lines by a plurality of semiconductor switching elements for inspection connected to the signal lines in a lump.

In such a lump inspection method, different from an inspection method of probing each of the plurality of gate signal lines and the plurality of source signal lines, an inspection device is not influenced by the resolution of a display panel and design (for example, the number of bumps) of a semiconductor chip, so that the general and inexpensive inspection can be realized.

In the inspection method, conventionally, a lighting inspection circuit including the plurality of semiconductor switching elements for inspection and the like is provided in a semiconductor chip mounting region in which a semiconductor chip is to be mounted. However, as the size of semiconductor chips is becoming smaller and the frame of the display panels is becoming narrower, the size of the semiconductor chip mounting region has to be decreased. Consequently, it is considered to divide the lighting inspection circuit into a plurality of parts and provide them in regions other than the semiconductor chip region.

However, a problem occurs such that an inspection for disconnection in lead wires from mounting terminals of semiconductor chips to a display plane cannot be performed. To solve the problem, a method of providing an inspection circuit intended to perform an inspection for disconnection in lead wires in a semiconductor chip mounting region is proposed (refer to, for example, Japanese Patent Application Laid-Open No. 2011-154161).

According to the method described in Japanese Patent Application Laid-Open No. 2011-154161, regardless of increase in the resolution of display panels and increase in the density of semiconductor chips, wires in a display plane, semiconductor elements, and wires from mounting terminals of semiconductor chips to the display plane can be inspected. However, the lighting state has to be checked in practice, so that an inspection has to be performed after a manufacturing process is carried out to a level at which displaying is possible. For example, in the case of a liquid crystal display device, the manufacturing process has to be carried out to a process of overlapping an array substrate and an opposed substrate and sealing liquid crystal between the substrates. There is, consequently, a problem such that in the case where it is found out that something is wrong with the array substrate at this manufacturing stage, the opposed substrate, the liquid crystal, and the cost of the manufacture up to the stage are wasted.

SUMMARY OF THE INVENTION

An object of the present invention is to provide an array substrate which can be inspected before the array substrate is overlapped with an opposed substrate without being influenced by increase in the density of semiconductor chips, and in which inspection for disconnection in lead wires from mounting terminals of semiconductor chips to the inside of a display region can be performed.

An array substrate according to the present invention includes: a plurality of gate signal lines extending in parallel at equal intervals; a plurality of source signal lines orthogonal to the plurality of gate signal lines and extending in parallel at equal intervals; a plurality of gate-driver mounting terminals connected to the plurality of gate signal lines via gate lead wires; and a plurality of source-driver mounting terminals connected to the plurality of source signal lines via source lead wires. The array substrate further includes: a plurality of gate-side array inspection terminals connected to the plurality of gate signal lines; and a plurality of source-side array inspection terminals connected to the plurality of source signal lines. The array substrate further includes: a common terminal for a gate lead wire disconnection inspection; a common terminal for a source lead wire disconnection inspection; a plurality of gate lead wire disconnection inspection circuits connected between the plurality of gate-driver mounting terminals and the common terminal for a gate lead wire disconnection inspection; and a plurality of source lead wire disconnection inspection circuits connected between the plurality of source-driver mounting terminals and the common terminal for a source lead wire disconnection inspection.

In the array substrate according to the present invention, since the source-side array inspection terminals and the gate-side array inspection terminals are provided in regions different from those of the gate-driver mounting terminals and the source-driver mounting terminals, a probe unit can be manufactured without restriction of the probe intervals, and even in the case of using a high-density semiconductor chip, a wiring inspection can be performed. Further, by providing the gate lead wire disconnection inspection circuits and the source lead wire disconnection inspection circuits, disconnection in the lead wires (the gate lead wires and the source lead wires) from the display region to the mounting terminals can be detected. Therefore, a faulty array substrate is not proceeded to the later manufacturing process, so that unnecessary process cost and use of members can be reduced, and the manufacturing cost can be decreased.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Configuration

Figure 1:
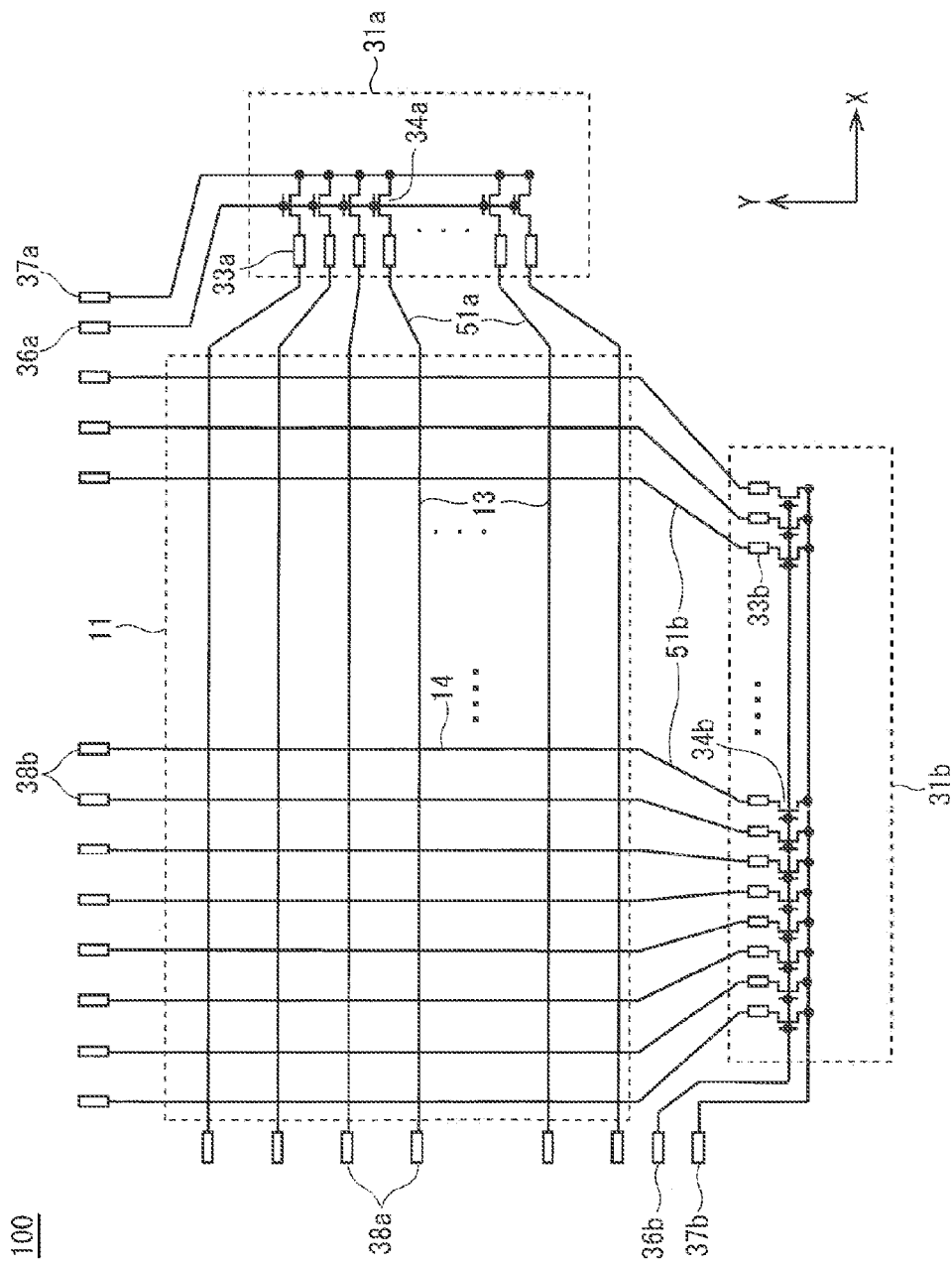
FIG. 1 is a plan view of an array substrate according to a first preferred embodiment.

FIG. 1 is a plan view of an array substrate 100 for a liquid crystal panel in the first preferred embodiment. As illustrated in FIG. 1, the array substrate 100 includes a display region 11 displayed by broken lines, semiconductor chip mounting regions (that is, a gate-driver mounting region 31a and a source-driver mounting region 31b), gate-side array inspection terminals 38a, and source-side array inspection terminals 38b.

Figure 2:
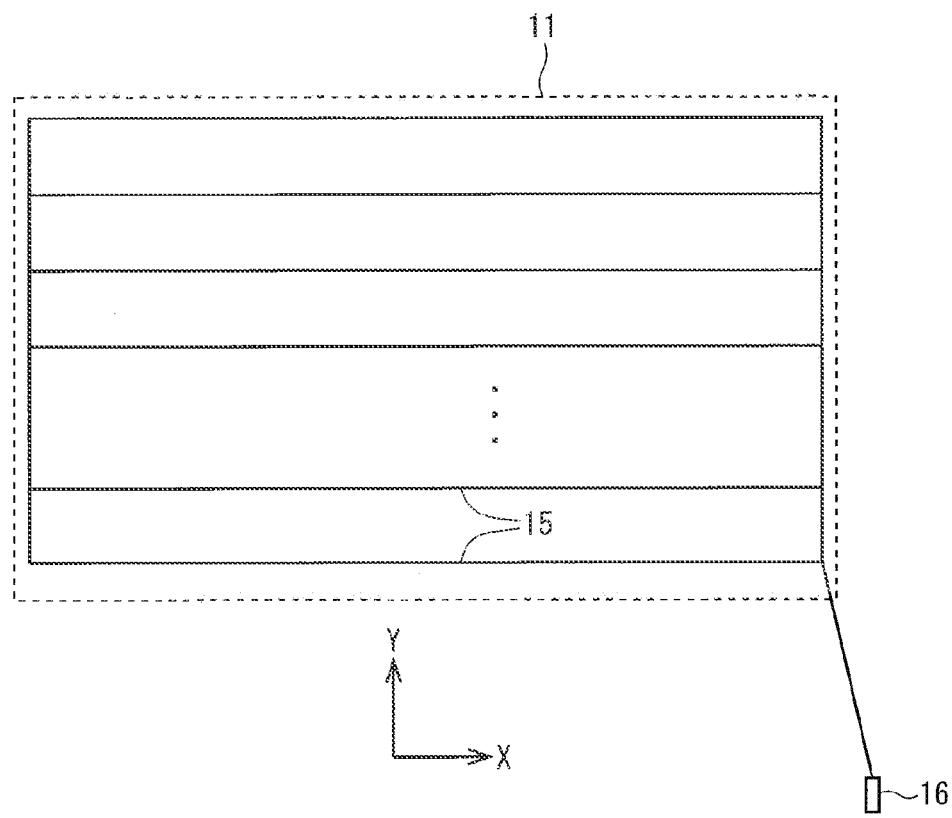
FIG. 2 is a plan view of common wires of the array substrate according to the first preferred embodiment.

The display region 11 is provided with a plurality of gate signal lines 13 and a plurality of source signal lines 14. The plurality of gate signal lines 13 extend in the X direction and are arranged in parallel in the Y direction. The plurality of source signal lines 14 extend in the Y direction and are arranged in parallel in the X direction. As illustrated in FIG. 2, a plurality of common wires 15 are provided at intervals equivalent to those of the gate signal lines 13, and the common wires 15 are electrically connected. For simplicity of the drawing, the common wires 15 are not illustrated in FIG. 1.

Figure 3:
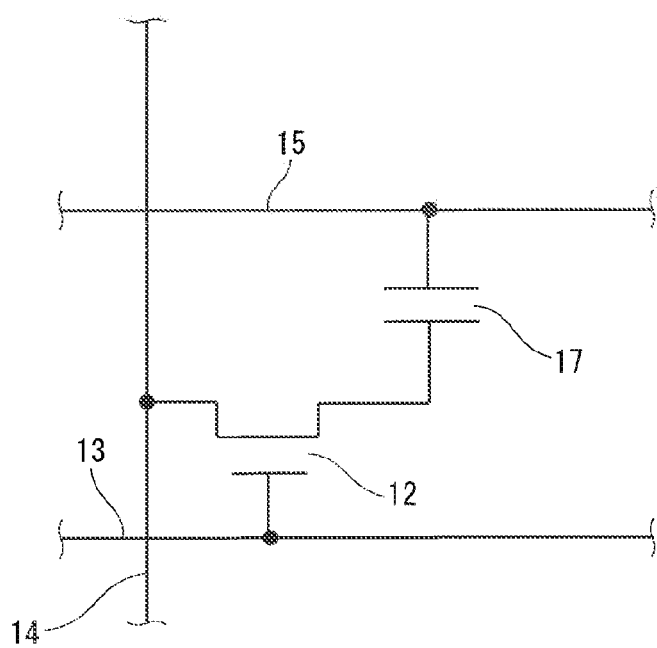
FIG. 3 is a view illustrating the configuration of a pixel in the array substrate according to the first preferred embodiment.

Although not illustrated in FIG. 1 for simplicity of the drawing, as illustrated in FIG. 3, a semiconductor switching element (in this case, a TFT (Thin Film Transistor) 12 for display) is disposed at the cross point of each gate signal line 13 and each source signal line 14. The gate electrode of the TFT 12 for display and the gate signal line 13 are connected to each other, and the source electrode and the source signal line 14 are connected to each other. The drain electrode of the TFT 12 for display is connected to the common wire 15 via a retention capacitor 17. Circuits each constructing the pixel illustrated in FIG. 3 are formed in a matrix at all of cross points of the plurality of gate signal lines 13 and the plurality of source signal lines 14.

A gate-side array inspection terminal 38a is connected to one end of the gate signal line 13, and a gate-driver mounting terminal 33a is connected to the other end of the gate signal line 13 via a gate lead wire 51a.

The gate-driver mounting region 31a is a region in which a semiconductor chip is mounted. The gate-driver mounting region 31a is provided with a plurality of gate-driver mounting terminals 33a connected to output bumps (not illustrated) of a gate driver in a later manufacturing process. The gate-driver mounting region 31a is also provided with a plurality of mounting terminals (not illustrated) connected to input bumps (not illustrated) of a gate driver in a later manufacture process.

The gate-driver mounting terminals 33a are connected to a common terminal 37a for a common gate lead wire disconnection inspection via a gate lead wire disconnection inspection circuit. In the preferred embodiment, the gate lead wire disconnection inspection circuit is a gate-side TFT 34a. The gate of each of the gate-side TFTs 34a is provided with a common gate-side switch terminal 36a.

The source-side array inspection terminal 38b is connected to one end of the source signal line 14, and a source-driver mounting terminal 33b is connected to the other end of the source signal line 14 via a source lead wire 51b.

The source-driver mounting region 31b is a region in which a semiconductor chip is mounted. The source-driver mounting region 31b is provided with the plurality of source-driver mounting terminals 33b connected to output bumps (not illustrated) of a source driver in a later manufacturing process. The source-driver mounting region 31b is also provided with a plurality of mounting terminals (not illustrated) connected to input bumps (not illustrated) of a source driver in a later manufacture process.

The source-driver mounting terminals 33b are connected to a common terminal 37b for a common source lead wire disconnection inspection via a source lead wire disconnection inspection circuit. In the preferred embodiment, the source lead wire disconnection inspection circuit is a source-side TFT 34b. The gate of each of the source-side TFTs 34b is provided with a common source-side switch terminal 36b.

It is assumed that the interval of the gate-side array inspection terminals 38a connected to the neighboring gate signal lines 13 is wider than that of the gate-driver mounting terminals 33a connected to the neighboring gate signal lines 13. Similarly, it is assumed that the interval of the source-side array inspection terminals 38b connected to the neighboring source signal lines 14 is wider than that of the source-driver mounting terminals 33b connected to the neighboring source signal lines 14.

In the case of constructing a liquid crystal display device by using the array substrate 100 illustrated in FIG. 1, liquid crystal is sealed in the space between the array substrate 100 and an opposed substrate which are overlapped and then semiconductor chips as a gate driver IC and a source driver IC are mounted in the gate-driver mounting region 31a and the source-driver mounting region 31b, respectively. Further, by mounting a circuit board for supplying drive signals to the gate-driver IC and the source driver IC and attaching a backlight, a desired image can be displayed in the display region 11.

Inspection on Display Region

A method of inspecting the display region 11 in the array substrate 100 will be described. First, an inspection probe is brought into contact with each of the gate-side array inspection terminals 38a, the source-side array inspection terminals 38b, a common terminal 16, the gate-side switch terminals 36a, the source-side switch terminals 36b, the common terminal 37a for a gate lead wire disconnection inspection, and the common terminal 37b for a source lead wire disconnection inspection, of the array substrate 100 illustrated in FIG. 1.

To the gate-side switch terminal 36a and the source-side switch terminal 36b, a potential to turn off the gate-side TFTs 34a and the source-side TFTs 34b is supplied via the inspection probes.

An arbitrary constant potential is supplied to the common terminal 37a for a gate lead wire disconnection inspection, the common terminal 37b for a source lead wire disconnection inspection, and the common terminal 16. By sequentially supplying a signal necessary for an array inspection to the gate-side array inspection terminals 38a and the source-side array inspection terminals 38b in this state, the array inspection on the display region 11 is performed. As the inspection method, a general method is used (refer to, for example, Japanese Patent Application Laid-Open No. S64-9375).

Lead Wire Disconnection Inspection

Next, a method of inspecting disconnection of the gate lead wires 51a and the source lead wires 51b, which cannot be inspected by the above-described inspection on the display region 11 will be described. First, a method of inspecting disconnection of the gate lead wires 51a connected to the gate signal line 13 will be described.

A potential different from that for the gate-side array inspection terminals 38a is preliminarily supplied to the common terminal 37a for a gate lead wire disconnection inspection. A potential which turns on the gate-side TFTs 34a is supplied to the gate-side switch terminal 36a. On this occasion, a current flowing in each of the gate signal lines 13 is measured by an ammeter of an inspection device connected via the gate-side array inspection terminals 38a, and the gate lead wire 51a connected to the gate signal line 13 from which a desired current amount is not obtained is determined as a disconnected wire.

Next, a method of inspecting disconnection of the source lead wires 51b connected to the source signal line 14 will be described. In a manner similar to the inspection on the gate lead wires 51a, a potential different from that for the source-side array inspection terminals 38b is preliminarily supplied to the common terminal 37b for a source lead wire disconnection inspection. A potential which turns on the source-side TFTs 34b is supplied to the source-side switch terminal 36b in a short time. On this occasion, an amount of charges flowed in each of the source signal lines 14 is measured by a charge amount measuring device of an inspection device connected via the source-side array inspection terminals 38b, and the source lead wire 51b connected to the source signal line 14 from which a desired charge amount is not obtained is determined as a disconnected wire.

Generally, an array inspection device has an ammeter on the gate signal line 13 side and a charge amount measuring device on the source signal line 14 side. Consequently, in the preferred embodiment, an example of measuring the gate lead wire 51a side by the ammeter and measuring the source lead wire 51b side by the charge amount measuring device has been described. It is sufficient to select the measurement by the ammeter or the charge amount measuring device in accordance with the configuration of the inspection device.

Although the gate-side array inspection terminals 38a are provided in the region on the side opposite to the gate-driver mounting region 31a via the display region 11, also by providing them in the connection part of the gate signal lines 13 and the gate lead wires 51a, disconnection of the gate lead wires 51a can be inspected. The source-side array inspection terminals 38b can be provided and inspected in a similar manner.

Effects

The array substrate 100 in the preferred embodiment includes: the plurality of gate signal lines 13 extending in parallel at equal intervals; the plurality of source signal lines 14 orthogonal to the plurality of gate signal lines 13 and extending in parallel at equal intervals; the plurality of gate-driver mounting terminals 33a connected to the plurality of gate signal lines 13 via the gate lead wires 51a; the plurality of source-driver mounting terminals 33b connected to the plurality of source signal lines 14 via the source lead wires 51b; the plurality of gate-side array inspection terminals 38a connected to the plurality of gate signal lines 13; the plurality of source-side array inspection terminals 38b connected to the plurality of source signal lines 14; the common terminal 37a for a gate lead wire disconnection inspection; the common terminal 37b for a source lead wire disconnection inspection; a plurality of gate lead wire disconnection inspection circuits connected between the plurality of gate-driver mounting terminals 33a and the common terminal 37a for a gate lead wire disconnection inspection; and a plurality of source lead wire disconnection inspection circuits connected between the plurality of source-driver mounting terminals 33b and the common terminal 37b for a source lead wire disconnection inspection.

Since the gate-side array inspection terminals 38a and the source-side array inspection terminals 38b are provided in regions different from those of the gate-driver mounting terminals 33a and the source-driver mounting terminals 33b, a probe unit can be manufactured without restriction of the probe intervals, and even in the case of using a high-density semiconductor chip, a wiring inspection can be performed. Further, by providing the gate lead wire disconnection inspection circuits and the source lead wire disconnection inspection circuits, disconnection in the lead wires (the gate lead wires 51a and the source lead wires 51b) from the display region 11 to the mounting terminals can be detected. Therefore, a faulty array substrate is not proceeded to the later manufacturing process, so that unnecessary process cost and use of members can be reduced, and the manufacturing cost can be decreased.

In the array substrate 100 in the preferred embodiment, the interval of the gate-side array inspection terminals 38a connected to the neighboring gate signal lines 13 is wider than the interval of the gate-driver mounting terminals 33a connected to the neighboring gate signal lines 13, and the interval of the source-side array inspection terminals 38b connected to the neighboring source signal lines 14 is wider than the interval of the source-driver mounting terminals 33b connected to the neighboring source signal lines 14.

Therefore, by providing the gate-side array inspection terminals 38a and the source-side array inspection terminals 38b in regions different from those of the gate-driver mounting terminals 33a and the source-driver mounting terminals 33b, making the intervals of the gate-side array inspection terminals 38a wider than those of the gate-driver mounting terminals 33a, and making the intervals of the source-side array inspection terminals 38b wider than those of the source-driver mounting terminals 33b, a probe unit can be manufactured without restriction of the probe intervals, and even in the case of using a high-density semiconductor chip, a wiring inspection can be performed.

In the array substrate 100 in the preferred embodiment, the gate lead wire disconnection inspection circuit is the gate-side TFT 34a, the common gate-side switch terminal 36a is connected to the gate of the gate-side TFT 34a, the source lead wire disconnection inspection circuit is the source-side TFT 34b, and the common source-side switch terminal 36b is connected to the gate of the source-side TFT 34b.

Therefore, by turning on/off the gate-side TFTs 34a by the gate-side switch terminal 36a and measuring, for example, the current flowing in the gate signal lines 13, disconnection in the gate lead wires 51a can be detected. Similarly, by turning on/off the source-side TFTs 34b by the source-side switch terminal 36b and measuring, for example, the amount of charges flowing in the source signal lines 14, disconnection in the source lead wires 51b can be detected.

A disconnection inspecting method for the gate lead wire 51a and the source lead wire 51b in the array substrate 100 in the preferred embodiment includes: measuring, via the gate-side array inspection terminal 38a, an amount of current or charges flowing in each of the gate signal lines 13 when the gate-side TFT 34a is turned on in a state where different voltages are applied to the gate-side array inspection terminal 38a and the common terminal 37a for a gate lead wire disconnection inspection; and measuring, via the source-side array inspection terminal 38b, an amount of current or charges flowing in each of the source signal lines 14 when the source-side TFT 34b is turned on in a state where different voltages are applied to the source-side array inspection terminal 38b and the common terminal 37b for a source lead wire disconnection inspection.

Therefore, by turning on/off the gate-side TFTs 34a by the gate-side switch terminal 36a and measuring, for example, the current flowing in the gate signal lines 13, disconnection in the gate lead wires 51a can be detected. Similarly, by turning on/off the source-side TFTs 34b by the source-side switch terminal 36b and measuring, for example, the amount of charges flowing in the source signal lines 14, disconnection in the source lead wires 51b can be detected.

A liquid crystal display device in the preferred embodiment includes: the array substrate 100; a gate driver mounted on the gate-driver mounting terminal 33a of the array substrate 100; a source driver mounted on the source-driver mounting terminal 33b of the array substrate 100; a circuit for driving the gate driver and the source driver; an opposed substrate disposed so as to face the array substrate 100; a liquid crystal held between the array substrate 100 and the opposed substrate; and a backlight attached to the back side of the array substrate 100.

Therefore, by manufacturing the liquid crystal display device having the array substrate 100 in the preferred embodiment, a faulty array substrate is not proceeded to the later manufacturing process, so that unnecessary process cost and use of members can be reduced, and the manufacturing cost can be decreased.

Second Preferred Embodiment

Configuration

Figure 4:
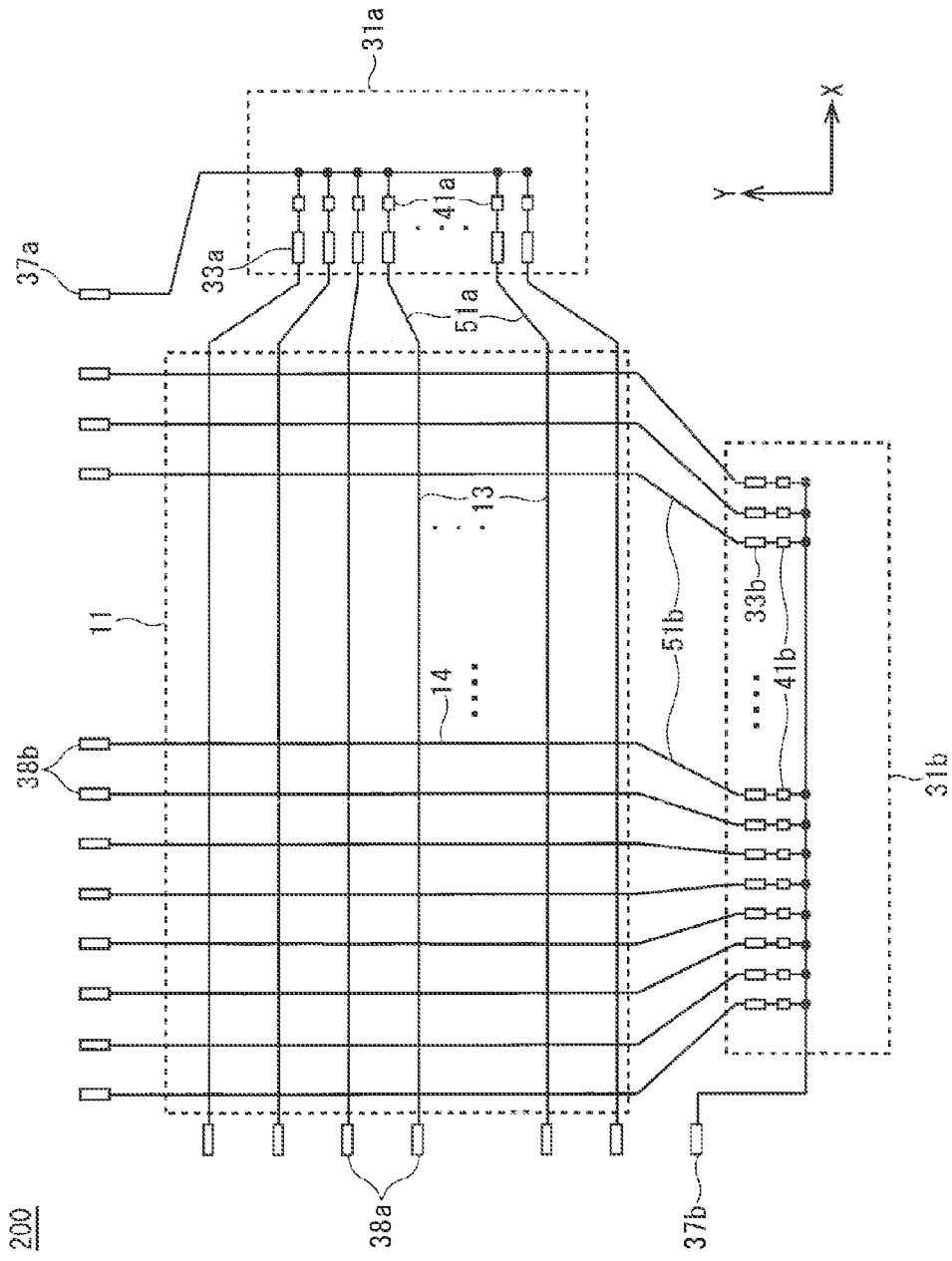
FIG. 4 is a plan view of an array substrate according to a second preferred embodiment.

FIG. 4 is a plan view of an array substrate 200 according to a second preferred embodiment. In the first preferred embodiment (FIG. 1), the gate-side TFTs 34a are used as the gate lead wire disconnection inspection circuits, and the source-side TFTs 34b are used as the source lead wire disconnection inspection circuits. On the other hand, in the second preferred embodiment, resistive elements 41a and 41b are used as a gate lead wire disconnection inspection circuit and a source lead wire disconnection inspection circuit. Although the gate-side switch terminal 36a and the source-side switch terminal 36b are provided to control the gate-side TFTs 34a and the source-side TFTs 34b in the first preferred embodiment, since the resistive elements are used in the second preferred embodiment, they are unnecessary in the second embodiment. For simplicity of the drawing, the common wires 15 are not illustrated in FIG. 4. The configuration of the common wire 15 is similar to that of FIG. 2. Since the other configuration is similar to that of the first preferred embodiment, the description will not be repeated.

Figure 5:
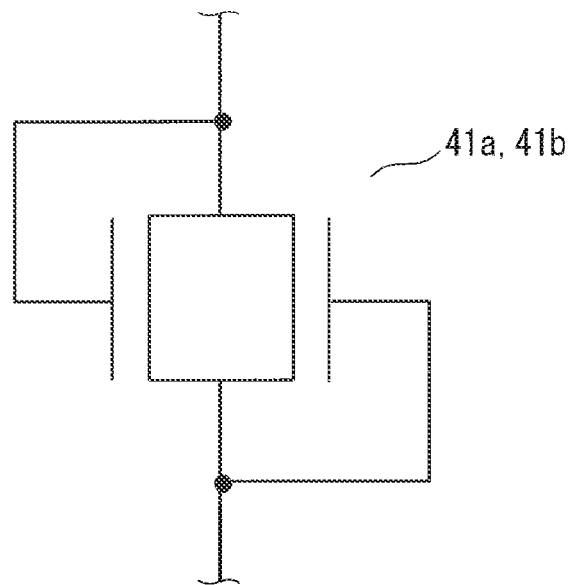
FIG. 5 is a view illustrating a bidirectional TFT in the array substrate according to the second preferred embodiment.

As each of the resistive elements 41a and 41b, it is sufficient to use a bidirectional TFT element having a circuit configuration illustrated in FIG. 5.

In the case of constructing, for example, a liquid crystal display device by using the array substrate 200 illustrated in FIG. 4, in a manner similar to the first preferred embodiment, liquid crystal is sealed in the space between the array substrate 200 and an opposed substrate which are overlapped and then semiconductor chips as a gate driver IC and a source driver IC are mounted in the gate-driver mounting region 31a and the source-driver mounting region 31b, respectively. Further, by mounting a circuit board for supplying drive signals to the gate-driver IC and the source driver IC and attaching a backlight, a desired image can be displayed in the display region 11.

Inspection of Display Region

A method of inspecting the display region 11 in the array substrate 200 will be described. First, an inspection probe is brought into contact with each of the gate-side array inspection terminals 38a, the source-side array inspection terminals 38b, the common terminal 16, the gate-side switch terminals 36a, the source-side switch terminals 36b, the common terminal 37a for a gate lead wire disconnection inspection, and the common terminal 37b for a source lead wire disconnection inspection, of the array substrate 200 illustrated in FIG. 4.

To the gate-side switch terminal 36a and the source-side switch terminal 36b, a potential to turn off the gate-side TFTs 34a and the source-side TFTs 34b is supplied via the inspection probes.

An arbitrary constant potential is supplied to the common terminal 37a for a gate lead wire disconnection inspection, the common terminal 37b for a source lead wire disconnection inspection, and the common terminal 16. By sequentially supplying a signal necessary for an array inspection to the gate-side array inspection terminals 38a and the source-side array inspection terminals 38b in this state, the array inspection on the display region 11 is performed. A general method is used as an inspection method in a manner similar to the first preferred embodiment.

Lead Wire Disconnection Inspection

Subsequent to the inspection on the display region 11, a disconnection inspection on the lead wires (the gate lead wires 51a and the source lead wires 51b) is performed.

First, to detect disconnection in the gate lead wires 51a connected to the gate signal lines 13, a potential different from that for the gate-side array inspection terminals 38a is supplied to the common terminal 37a for a gate lead wire disconnection inspection. On this occasion, a current flowing in each of the gate signal lines 13 is measured by an ammeter of an inspection device connected via the gate-side array inspection terminals 38a. The gate lead wire 51a connected to the gate signal line 13 from which a desired current amount is not obtained is determined as a disconnected wire.

Next, to detect a disconnection in the source lead wire 51b connected to the source signal line 14, a potential different from that for the source-side array inspection terminals 38b is supplied to the common terminal 37b for a source lead wire disconnection inspection. On this occasion, an amount of charges flowed in each of the source signal lines 14 is measured by a charge amount measuring device of an inspection device connected via the source-side array inspection terminals 38b. The source lead wire 51b connected to the source signal line 14 from which a desired charge amount is not obtained is determined as a disconnected wire.

Generally, an array inspection device has an ammeter on the gate signal line side and a charge amount measuring device on the source signal line side. Consequently, the case of measuring the first lead wire side by the ammeter and measuring the second lead wire side by the charge amount measuring device has been described above. It is sufficient to select the measurement by the ammeter or the charge amount measuring device in accordance with the configuration of the inspection device.

Although the gate-side array inspection terminals 38a are provided in the region on the side opposite to the gate-driver mounting region 31a via the display region 11 in the preferred embodiment, also by providing them in the connection part of the gate signal lines 13 and the gate lead wires 51a, disconnection of the gate lead wires 51a can be inspected. The source-side array inspection terminals 38b can be provided and inspected in a similar manner.

In the array substrate 200 in the preferred embodiment, in a manner similar to the first preferred embodiment, the gate-side array inspection terminals 38a in the display region 11 are provided in a region different from the gate-driver mounting terminals 33a or a region near the mounting terminals, and the source-side array inspection terminals 38b are provided in a region different from the source-driver mounting terminals 33b or a region near the mounting terminals. Therefore, a probe unit can be manufactured without restriction of the probe intervals and, even in the case of using a high-density semiconductor chip, an array inspection can be performed. Further, by using the circuit for a lead wire disconnection inspection provided on the semiconductor chip side, disconnection in the lead wires from the mounting terminals to the display region can be detected. Consequently, a faulty panel is not proceeded to the later process, so that unnecessary process cost and use of members can be reduced, and the cost of the display device can be decreased.

Effects

In the array substrate 200 in the preferred embodiment, the gate lead wire disconnection inspection circuit is the resistive element 41a, and the source lead wire disconnection inspection circuit is the resistive element 41b.

Therefore, by using the resistive element 41a as the gate lead wire disconnection inspection circuit, for example, disconnection in the gate lead wires 51a can be detected by measuring the current flowing in the gate signal lines 13. Similarly, by using the resistive element 41b as the gate lead wire disconnection inspection circuit, for example, disconnection in the source lead wires 51b can be detected by measuring the amount of charges flowing in the source signal lines 14.

Further, as compared with the array substrate 100 of the first preferred embodiment, in the array substrate 200 in the second preferred embodiment, the gate-side switch terminal 36a, the source-side switch terminal 36b, and wiring for them are unnecessary, so that the circuit for inspecting a lead wire can be simplified. Since the gate lead wire disconnection inspection circuit and the source lead wire disconnection inspection circuit also play the role of a short ring functioning as a preventer of static charge of the array substrate 200, it is unnecessary to provide a short ring. Therefore, a display of a small frame can be fabricated.

A disconnection inspecting method for the gate lead wire 51a and the source lead wire 51b in the array substrate 200 in the preferred embodiment includes: measuring, via the gate-side array inspection terminal 38a, an amount of current or charges flowing in each of the gate signal lines 13 in a state where different voltages are applied to the gate-side array inspection terminal 38a and the common terminal 37a for a gate lead wire disconnection inspection; and measuring, via the source-side array inspection terminal 38b, an amount of current or charges flowing in each of the source signal lines 14 in a state where different voltages are applied to the source-side array inspection terminal 38b and the common terminal 37b for a source lead wire disconnection inspection.

Therefore, for example, by measuring the current flowing in the gate signal line 13, disconnection in the gate lead wire 51a can be detected. Similarly, for example, by measuring the amount of charges flowing in the source signal line 14, disconnection in the source lead wire 51b can be detected.

Third Preferred Embodiment

Configuration

Figure 6:
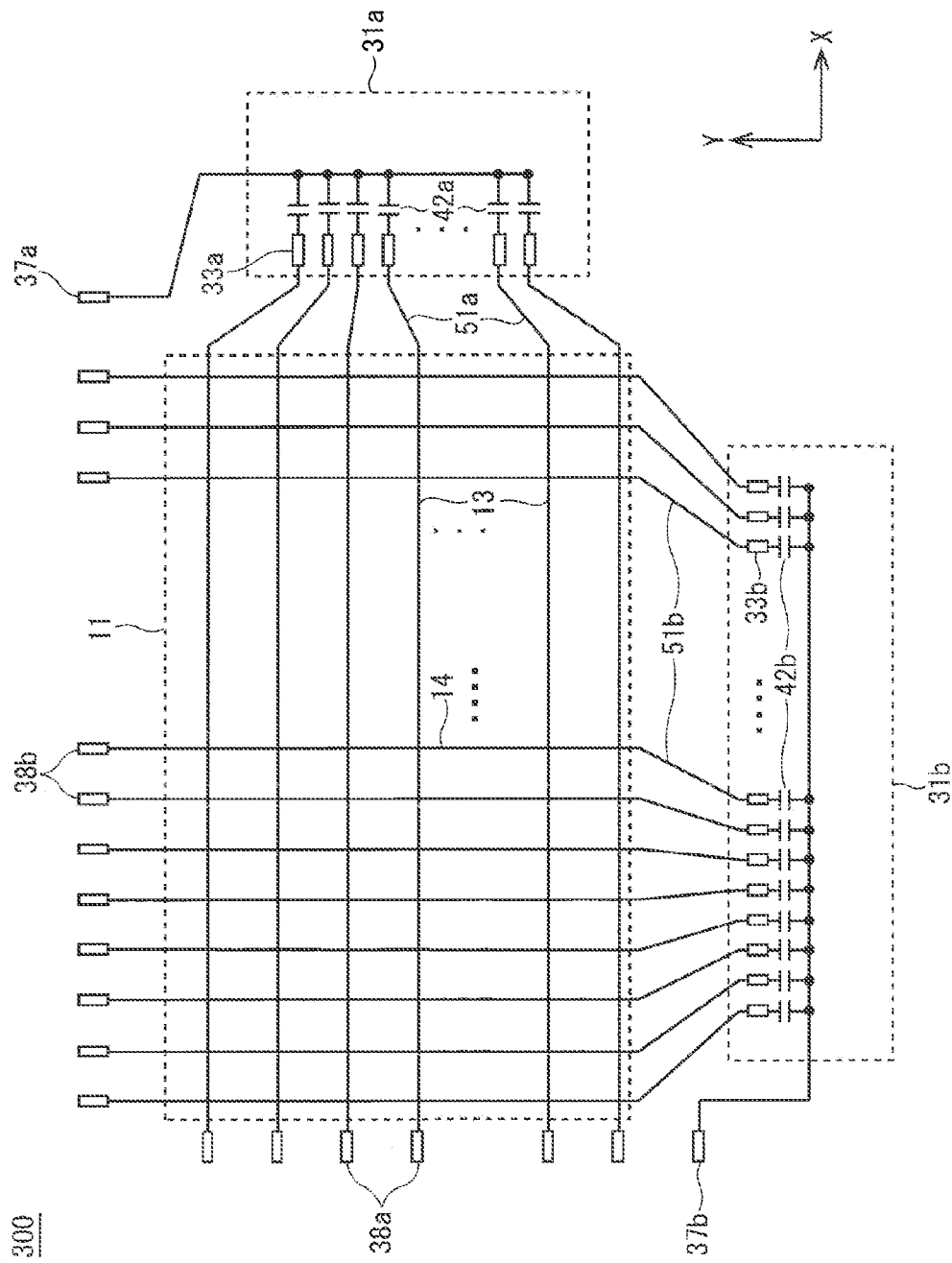
FIG. 6 is a plan view of an array substrate according to a third preferred embodiment.

FIG. 6 is a plan view of an array substrate 300 in a third preferred embodiment. In the second preferred embodiment, the resistive elements 41a and 41b are used as the gate lead wire disconnection inspection circuit and the source lead wire disconnection inspection circuit. On the other hand, in the third preferred embodiment, capacitive elements 42a and 42b are used as the gate lead wire disconnection inspection circuit and the source lead wire disconnection inspection circuit. In FIG. 6, for simplicity of the drawing, the common wires 15 are not illustrated. The configuration of the common wires 15 is similar to that of FIG. 2. Since the other configuration is similar to that of the second preferred embodiment, the description will not be repeated.

In the case of constructing, for example, a liquid crystal display device by using the array substrate 300 illustrated in FIG. 6, in a manner similar to the first preferred embodiment, liquid crystal is sealed in the space between the array substrate 300 and an opposed substrate and then semiconductor chips as a gate driver IC and a source driver IC are mounted in the gate-driver mounting region 31a and the source-driver mounting region 31b, respectively. Further, by mounting a circuit board for supplying drive signals to the gate-driver IC and the source driver IC and attaching a backlight, a desired image can be displayed in the display region 11.

Next, a method of inspecting the display region 11 in the array substrate 300 in the preferred embodiment will be described. Since the method of inspecting the display region 11 is similar to that in the first and second preferred embodiments, the description will not be described.

Lead Wire Disconnection Inspection

Subsequent to the inspection on the display region 11, a disconnection inspection on the lead wires (the gate lead wires 51a and the source lead wires 51b) is performed.

First, to detect disconnection in the gate lead wires 51a connected to the gate signal lines 13, a potential different from that for the gate-side array inspection terminals 38a is supplied to the common terminal 37a for a gate lead wire disconnection inspection. On this occasion, the amount of charges flowing in each of the gate signal lines 13 is measured by a charge amount measuring device of an inspection device connected via the gate-side array inspection terminals 38a. The gate lead wire 51a connected to the gate signal line 13 from which a desired current amount is not obtained is determined as a disconnected wire.

Next, to detect a disconnection in the source lead wire 51b connected to the source signal line 14, a potential different from that for the source-side array inspection terminals 38b is supplied to the common terminal 37b for a source lead wire disconnection inspection. On this occasion, an amount of charges flowed in each of the source signal lines 14 is measured by a charge amount measuring device of an inspection device connected via the source-side array inspection terminals 38b. The source lead wire 51b connected to the source signal line 14 from which a desired charge amount is not obtained is determined as a disconnected wire.

Although the gate-side array inspection terminals 38a are provided in the region on the side opposite to the gate-driver mounting region 31a via the display region 11 in the preferred embodiment, also by providing them in the connection part of the gate signal lines 13 and the gate lead wires 51a, disconnection of the gate lead wires 51a can be inspected. The source-side array inspection terminals 38b can be provided and inspected in a similar manner.

In the array substrate 300 in the preferred embodiment, in a manner similar to the first preferred embodiment, the gate-side array inspection terminals 38a are provided in a region different from the gate-driver mounting terminals 33a or a region near the mounting terminals, and the source-side array inspection terminals 38b are provided in a region different from the source-driver mounting terminals 33b or a region near the mounting terminals. Therefore, a probe unit can be manufactured without restriction of the probe intervals and, even in the case of using a high-density semiconductor chip, an array inspection can be performed. Further, by using the circuit for a lead wire disconnection inspection provided on the semiconductor chip side, disconnection in the lead wires from the mounting terminals to the display region can be detected. Consequently, a faulty panel is not proceeded to the later process, so that unnecessary process cost and use of members can be reduced, and the cost of the display device can be decreased.

Effects

In the array substrate 300 in the preferred embodiment, the gate lead wire disconnection inspection circuit is the capacitive element 42a, and the source lead wire disconnection inspection circuit is the capacitive element 42b.

Therefore, by using the capacitive element 42a as the gate lead wire disconnection inspection circuit, for example, disconnection in the gate lead wires 51a can be detected by measuring the amount of charges flowing in the gate signal lines 13. Similarly, by using the capacitive element 42b as the gate lead wire disconnection inspection circuit, for example, disconnection in the source lead wires 51b can be detected by measuring the amount of charges flowing in the source signal lines 14. In the preferred embodiment, since TFTs are not used as the gate lead wire disconnection inspection circuit and the source lead wire disconnection inspection circuit. Consequently, a compact lead wire disconnection inspection circuit can be formed, and further, the present invention can be applied to a high-density semiconductor chip.

A disconnection inspecting method for the gate lead wire 51a and the source lead wire 51b in the array substrate 300 in the preferred embodiment includes: measuring, via the gate-side array inspection terminal 38a, an amount of charges flowing in each of the gate signal lines 13 in a state where different voltages are applied to the gate-side array inspection terminal 38a and the common terminal 37a for a gate lead wire disconnection inspection; and measuring, via the source-side array inspection terminal 38b, an amount of charges flowing in each of the source signal lines 14 in a state where different voltages are applied to the source-side array inspection terminal 38b and the common terminal 37b for a source lead wire disconnection inspection.

Therefore, by measuring the amount of charges flowing in the gate signal lines 13, disconnection in the gate lead wire 51a can be detected. Similarly, by measuring the amount of charges flowing in the source signal lines 14, disconnection in the source lead wire 51b can be detected.

Fourth Preferred Embodiment

Configuration

Figure 7:
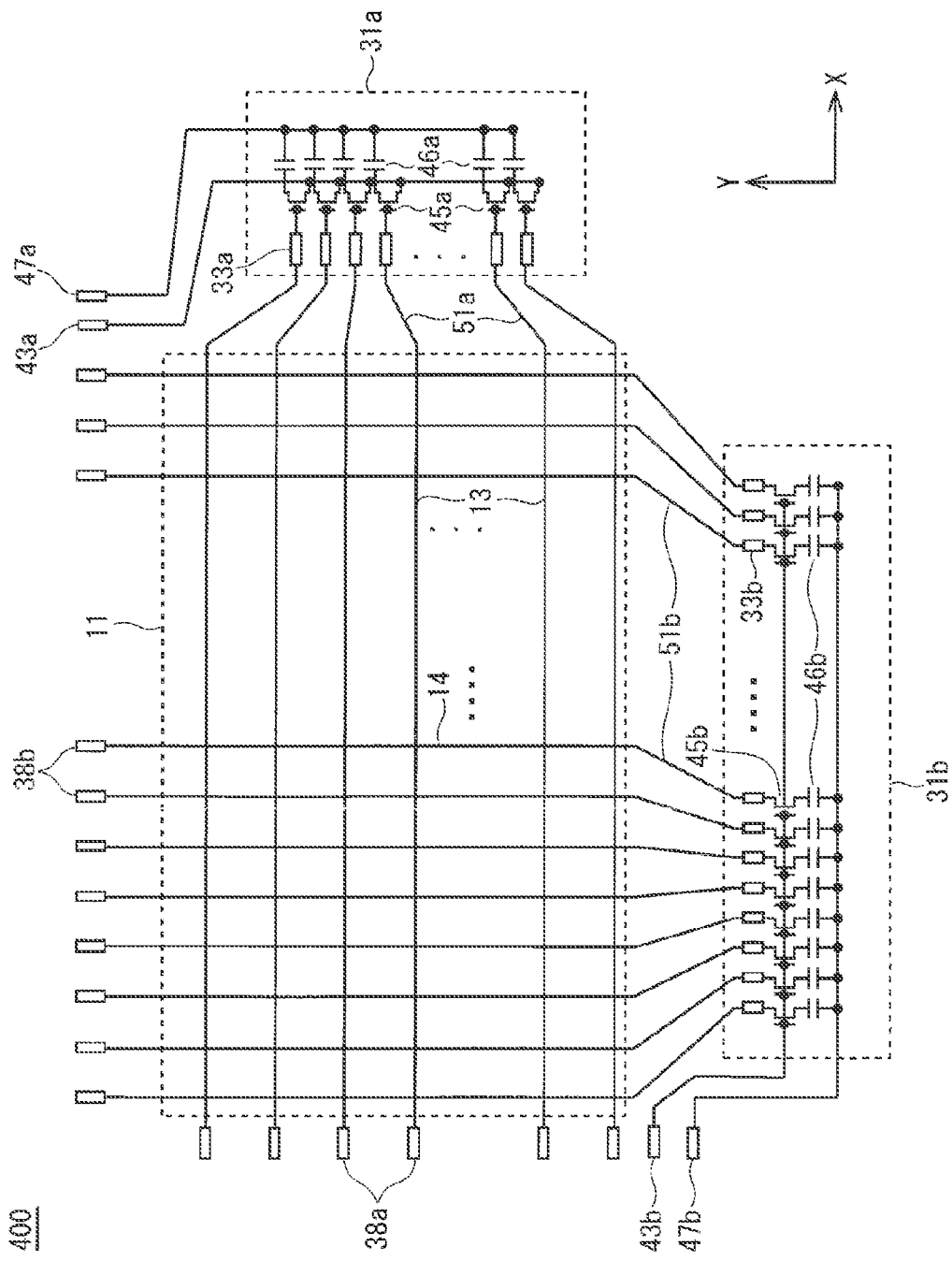
FIG. 7 is a plan view of an array substrate according to a fourth preferred embodiment.

FIG. 7 is a plan view of an array substrate 400 according to a fourth preferred embodiment. In the preferred embodiment, circuits almost equivalent to those constructing the pixel illustrated in FIG. 3 are used as the gate lead wire disconnection inspection circuit and the source lead wire disconnection inspection circuit.

Concretely, the gate-driver mounting terminal 33a is connected to the gate electrode of a TFT 45a equivalent to the display TFT 12 of a pixel. To the source electrode of the TFT 45a, a gate lead wire disconnection inspection terminal 43a is connected. To the drain electrode of the TFT 45a, a common terminal 47a for a gate lead wire disconnection inspection is connected via a capacitive element 46a equivalent to the retention capacitor 17 of a pixel.

The source-driver mounting terminal 33b is connected to the source electrode of a TFT 45b equivalent to the display TFT 12 of a pixel. To the gate electrode of the TFT 45b, a source lead wire disconnection inspection terminal 43b is connected. To the drain electrode of the TFT 45b, a common terminal 47b for a source lead wire disconnection inspection is connected via a capacitive element 46b equivalent to the retention capacitor 17 of a pixel.

In FIG. 7, for simplicity of the drawing, the common wires 15 are not illustrated. The configuration of the common wire 15 is similar to that of FIG. 2. Since the other configuration is similar to that of the first embodiment, the description will not be repeated.

By employing the configuration as illustrated in FIG. 7, the array substrate 400 has a circuit configuration similar to that of a substrate obtained by adding one row at the bottom and adding one column to the right side in FIG. 7 to the pixels arranged in a matrix at the cross points of the gate signal lines 13 and the source signal lines 14 in the display region 11. With the configuration, by a method similar to the inspection on the display region 11, a disconnection inspection on the gate lead wires 51a and the source lead wires 51b can be performed.

In the case of constructing, for example, a liquid crystal display device by using the array substrate 400 illustrated in FIG. 7, in a manner similar to the first preferred embodiment, liquid crystal is sealed in the space between the array substrate 400 and an opposed substrate and then semiconductor chips as a gate driver IC and a source driver IC are mounted in the gate-driver mounting region 31a and the source-driver mounting region 31b, respectively. Further, by mounting a circuit board for supplying drive signals to the gate-driver IC and the source driver IC and attaching a backlight, a desired image can be displayed in the display region 11.

Inspection on Display Region and Lead Wires

A method of inspecting the display region 11 and lead wires (the gate lead wires 51a and the source lead wires 51b) will be described. First, for an inspection, an inspection probe is brought into contact with each of the gate-side array inspection terminals 38a, the source-side array inspection terminals 38b, gate lead wire disconnection inspection terminals 43a, source lead wire disconnection inspection terminals 43b, the common terminal 16, the common terminal 47a for a gate lead wire disconnection inspection, and the common terminal 47b for a source lead wire disconnection inspection, of the array substrate 400.

An arbitrary constant potential is supplied to each of the common terminal 16, the common terminal 47a for a gate lead wire disconnection inspection, and the common terminal 47b for a source lead wire disconnection inspection. By sequentially supplying a signal necessary for an array inspection to the gate-side array inspection terminals 38a and the source-side array inspection terminals 38b, an array inspection on the display region 11 is executed.

At this time, the array inspection is performed by regarding the gate lead wire disconnection inspection terminal 43a as a terminal equivalent to the gate-side array inspection terminal 38a for the gate signal line 13 and regarding the source lead wire disconnection inspection terminal 43b as a terminal equivalent to the source-side array inspection terminal 38b for the source signal line 14. Since the method of the array inspection is the same as that of the first preferred embodiment, the description will not be repeated.

In the case that the display region 11 is constructed by a matrix of m×n pixels, in the preferred embodiment, an array inspection is performed by regarding the display region 11 as a matrix of (m+1)×(n+1) pixels. Since a pixel equivalent circuit of the address of (m+1, n+1) does not exist, the inspection result of it is ignored. In the case where a defect is detected in the (m+1)th row and the (n+1)th column as a result of the array inspection, the gate lead wire 51a or the source lead wire 51b corresponding to the address is determined as a disconnected wire.

In the array substrate 400 in the preferred embodiment, in a manner similar to the first preferred embodiment, the gate-side array inspection terminals 38a and the source-side array inspection terminals 38b in the display region 11 are provided in regions different from the gate-driver mounting terminals 33a and the source-driver mounting terminals 33b or regions near the mounting terminals, so that a probe unit can be manufactured without restriction of the probe intervals, and even in the case of using a high-density semiconductor chip, an array inspection can be performed. Further, by using the circuit for a lead wire disconnection inspection provided on the semiconductor chip side, disconnection in the lead wires from the mounting terminals to the display region can be detected. Consequently, a faulty panel is not proceeded to the later process, so that unnecessary process cost and use of members can be reduced, and the cost of the display device can be decreased.

Since the disconnection inspection on the lead wires can be performed by a method similar to a general array inspection, it is unnecessary to modify the inspection device or provide another inspection condition. The disconnection inspection on the lead wires can be performed more easily as compared with the array substrates 100, 200, and 300 of the first, second, and third preferred embodiments.

In the preferred embodiment, although the gate-side array inspection terminals 38a are provided in the region on the side opposite to the gate-driver mounting region 31a via the display region 11 in the preferred embodiment, also by providing them in the connection part of the gate signal lines 13 and the gate lead wires 51a, disconnection of the gate lead wires 51a can be inspected. The source-side array inspection terminals 38b can be provided and inspected in a similar manner. The common terminal 47a for a gate lead wire disconnection inspection and the common terminal 47b for a source lead wire disconnection inspection may be used as terminals common to the common terminal 16.

Effects

In the array substrate 400 in the preferred embodiment, the gate lead wire disconnection inspection circuit has the TFTs 45a and the capacitive elements 46a, the capacitive element 46a is connected between the drain of the TFT 45a and the common terminal 47a for a gate lead wire disconnection inspection, the gate of the TFT 45a is connected to the gate-driver mounting terminal 33a, and the common gate lead wire disconnection inspection terminal 43a is connected to the source of the TFT 45a. The source lead wire disconnection inspection circuit has the TFTs 45b and the capacitive elements 46b, the capacitive element 46b is connected between the drain of the TFT 45b and the common terminal 47b for a source lead wire disconnection inspection, the common source lead wire disconnection inspection terminal 43b is connected to the gate of the TFT 45b, and the source of the TFT 45b is connected to the source-driver mounting terminal 33b.

Therefore, by regarding the gate lead wire disconnection inspection terminal 43a as the gate-side array inspection terminal 38a, regarding the source lead wire disconnection inspection terminal 43b as the source-side array inspection terminal 38b, and making the potential of the common terminal 47a for a gate lead wire disconnection inspection and the common terminal 47b for a source lead wire disconnection inspection common to the potential of the common terminal 16, the circuit of the matrix of the display region 11 has the circuit configuration which is expanded by one row and one column. Therefore, by the same method as that of the array inspection on the display region 11, the disconnection inspection on the lead wires can be performed.

A method of inspecting the array substrate 400 in the preferred embodiment includes: (a) inspecting disconnection in the gate signal lines 13 and the source signal lines 14; and (b) inspecting disconnection in the gate lead wires 51a and the source lead wires 51b. At the time of performing the (b), the gate lead wire disconnection inspection terminal 43a is regarded as the gate-side array inspection terminal 38a, the source lead wire disconnection inspection terminal 43b is regarded as the source-side array inspection terminal 38b, common voltage is supplied to the common terminal 47a for a gate lead wire disconnection inspection and the common terminal 47b for a source lead wire disconnection inspection, and the (b) is performed in the same manner as that for the (a).

Therefore, by the same method as that of performing the array inspection on the display region 11, the disconnection inspection on the gate lead wires 51a and the source lead wires 51b can be performed. Since the disconnection inspection on the lead wires can be performed by a method similar to a general array inspection, it is unnecessary to modify the inspection device or provide another inspection condition, and the disconnection inspection on the lead wires can be performed more easily as compared with the array substrates 100, 200, and 300 of the first, second, and third preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. An array substrate comprising:
    a plurality of gate signal lines extending in parallel at equal intervals;
    a plurality of source signal lines orthogonal to said plurality of gate signal lines and extending in parallel at equal intervals;
    a plurality of gate-driver mounting terminals connected to said plurality of gate signal lines via gate lead wires;
    a plurality of source-driver mounting terminals connected to said plurality of source signal lines via source lead wires;
    a plurality of gate-side array inspection terminals connected to said plurality of gate signal lines;
    a plurality of source-side array inspection terminals connected to said plurality of source signal lines;
    a common terminal for a gate lead wire disconnection inspection;
    a common terminal for a source lead wire disconnection inspection;
    a plurality of gate lead wire disconnection inspection circuits connected between said plurality of gate-driver mounting terminals and said common terminal for a gate lead wire disconnection inspection; and
    a plurality of source lead wire disconnection inspection circuits connected between said plurality of source-driver mounting terminals and said common terminal for a source lead wire disconnection inspection.

2. The array substrate according to claim 1, wherein an interval of said gate-side array inspection terminals connected to neighboring gate signal lines is wider than an interval of said gate-driver mounting terminals connected to said neighboring gate signal lines, and an interval of said source-side array inspection terminals connected to neighboring source signal lines is wider than an interval of said source-driver mounting terminals connected to said neighboring source signal lines.

3. The array substrate according to claim 1, wherein said gate lead wire disconnection inspection circuit is a gate-side TFT, a common gate-side switch terminal is connected to a gate of the gate-side TFT,
    said source lead wire disconnection inspection circuit is a source-side TFT, and a common source-side switch terminal is connected to a gate of the source-side TFT.

4. A disconnection inspecting method for said gate lead wire and said source lead wire in the array substrate described in claim 3, comprising:
    measuring, via said gate-side array inspection terminal, an amount of current or charges flowing in each of said gate signal lines when said gate-side TFT is turned on in a state where different voltages are applied to said gate-side array inspection terminal and said common terminal for a gate lead wire disconnection inspection; and
    measuring, via said source-side array inspection terminal, an amount of current or charges flowing in each of said source signal lines when said source-side TFT is turned on in a state where different voltages are applied to said source-side array inspection terminal and said common terminal for a source lead wire disconnection inspection.

5. The array substrate according to claim 1, wherein said gate lead wire disconnection inspection circuit is a resistive element, and
    said source lead wire disconnection inspection circuit is a resistive element.

6. A disconnection inspecting method for said gate lead wire and said source lead wire in the array substrate described in claim 5, comprising:
    measuring, via said gate-side array inspection terminal, an amount of current or charges flowing in each of said gate signal lines in a state where different voltages are applied to said gate-side array inspection terminal and said common terminal for a gate lead wire disconnection inspection; and
    measuring, via said source-side array inspection terminal, an amount of current or charges flowing in each of said source signal lines in a state where different voltages are applied to said source-side array inspection terminal and said common terminal for a source lead wire disconnection inspection.

7. The array substrate according to claim 1, wherein said gate lead wire disconnection inspection circuit is a capacitive element, and said source lead wire disconnection inspection circuit is a capacitive element.

8. A disconnection inspecting method for said gate lead wire and said source lead wire in the array substrate described in claim 7, comprising:
    measuring, via said gate-side array inspection terminal, an amount of charges flowing in each of said gate signal lines in a state where different voltages are applied to said gate-side array inspection terminal and said common terminal for a gate lead wire disconnection inspection; and
    measuring, via said source-side array inspection terminal, an amount of charges flowing in each of said source signal lines in a state where different voltages are applied to said source-side array inspection terminal and said common terminal for a source lead wire disconnection inspection.

9. The array substrate according to claim 1, wherein said gate lead wire disconnection inspection circuit has a TFT and a capacitive element,
    the capacitive element is connected between a drain of the TFT and said common terminal for a gate lead wire disconnection inspection,
    a gate of the TFT is connected to said gate-driver mounting terminal,
    a common gate lead wire disconnection inspection terminal is connected to a source of the TFT, said source lead wire disconnection inspection circuit has a TFT and a capacitive element, the capacitive element is connected between the drain of the TFT and said common terminal for a source lead wire disconnection inspection, a common source lead wire disconnection inspection terminal is connected to the gate of the TFT, and the source of the TFT is connected to said source-driver mounting terminal.

10. A method of inspecting the array substrate described in claim 9, comprising:
    (a) inspecting disconnection in said gate signal line and said source signal line; and
    (b) inspecting disconnection in said gate lead wire and said source lead wire,
    wherein at the time of performing said (b),
    said gate lead wire inspection terminal is regarded as said gate-side array inspection terminal,
    said source lead wire inspection terminal is regarded as said source-side array inspection terminal,
    common voltage is supplied to said common terminal for a gate lead wire disconnection inspection and said common terminal for a source lead wire disconnection inspection, and
    said (b) is performed in the same manner as that for said (a).

11. A liquid crystal display device comprising:
    the array substrate according to claim 1;
    a gate driver mounted on said gate-driver mounting terminal of said array substrate;
    a source driver mounted on said source-driver mounting terminal of said array substrate;
    a circuit for driving said gate driver and said source driver;
    an opposed substrate disposed so as to face said array substrate;
    a liquid crystal held between said array substrate and said opposed substrate; and
    a backlight attached to a back side of said array substrate.

* * * * *